United States Patent
Cheng et al.

(10) Patent No.: US 9,917,904 B1
(45) Date of Patent: *Mar. 13, 2018

(54) IDENTIFYING NON-SEARCH ACTIONS BASED ON A SEARCH-QUERY

(71) Applicant: Google Inc., Mountain View, CA (US)

(72) Inventors: Tak Keung Cheng, Los Altos, CA (US); Robert Stacey, San Mateo, CA (US); Othar Hansson, Sunnyvale, CA (US); Brett R. Lider, San Francisco, CA (US); Tomer Kol, Illit (IL); Iftach Hyams, Haifa (IL)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/256,040

(22) Filed: Sep. 2, 2016

Related U.S. Application Data

(63) Continuation of application No. 14/150,330, filed on Jan. 8, 2014, now Pat. No. 9,460,209, which is a
(Continued)

(51) Int. Cl.
- *G06F 17/30* (2006.01)
- *H04L 29/08* (2006.01)
- *G06F 3/16* (2006.01)

(52) U.S. Cl.
CPC ............ *H04L 67/141* (2013.01); *G06F 3/167* (2013.01); *G06F 17/30864* (2013.01)

(58) Field of Classification Search
CPC ......... G06F 17/30672; G06F 17/30663; G06F 17/30; G06F 17/30424; G06F 17/30675
See application file for complete search history.

(56) References Cited

U.S. PATENT DOCUMENTS

| 7,599,914 B2 | 10/2009 | Patterson |
| 7,844,668 B2 | 11/2010 | Canning et al. |

(Continued)

OTHER PUBLICATIONS

Futz.me. "A Command Line for the Web." [Retrieved on Jan. 7, 2011]. Retrieved from the Internet <URL: http://futz.me/site> (3 pages).

(Continued)

*Primary Examiner* — Debbie Le
(74) *Attorney, Agent, or Firm* — Fish & Richardson P.C.

(57) ABSTRACT

In general, the subject matter described in this specification can be embodied in methods, systems, and program products for invoking a non-search action based on a search query. A server system receives a search query from a remote computing device. The server system determines whether the search query includes reserved text that indicates an intent by a user that provided the search query to the remote computing device to perform a non-search messaging action instead of or in addition to obtaining search results. The server system provides to the computing device, in response to determining that the search query includes the reserved text, code for causing the remote computing device to display a draft communication that includes at least the search query without the reserved text, and for allowing the user to edit the draft communication before transmitting the draft communication for receipt by recipient users.

17 Claims, 9 Drawing Sheets

Related U.S. Application Data continuation of application No. 13/022,755, filed on Feb. 8, 2011, now Pat. No. 8,650,210.

(60) Provisional application No. 61/302,955, filed on Feb. 9, 2010.

(56) References Cited

U.S. PATENT DOCUMENTS

| | | | |
|---|---|---|---|
| 7,844,669 B1* | 11/2010 | Mohler | G06Q 10/107 709/206 |
| 8,037,047 B2 | 10/2011 | Szeto et al. | |
| 8,200,847 B2 | 6/2012 | LeBeau et al. | |
| 9,031,216 B1* | 5/2015 | Kamvar | H04M 3/56 379/202.01 |
| 2005/0138002 A1 | 6/2005 | Giacobbe et al. | |
| 2006/0047656 A1 | 3/2006 | Dehlinger et al. | |
| 2006/0085280 A1 | 4/2006 | Murnan | |
| 2008/0084976 A1* | 4/2008 | Brackmann | H04M 3/4878 379/93.25 |
| 2009/0249198 A1 | 10/2009 | Davis | |
| 2009/0287681 A1 | 11/2009 | Paek et al. | |
| 2010/0082649 A1* | 4/2010 | Gutt | G06F 17/30864 707/758 |
| 2011/0055185 A1 | 3/2011 | Bitan et al. | |
| 2011/0246910 A1 | 10/2011 | Moxley | |
| 2012/0022876 A1 | 1/2012 | LeBeau et al. | |
| 2012/0254150 A1 | 10/2012 | Gupta | |
| 2012/0323905 A1* | 12/2012 | Qiao | G06F 17/30672 707/723 |
| 2012/0323909 A1 | 12/2012 | Behforooz | |

OTHER PUBLICATIONS

Google Search Features. "Improve Your Search Experience." [Retrieved on Jan. 7, 2011]. Retrieved from the Internet <URL: http://google.com/intl/en/help/features.html> (6 pages).

Microsoft. "mailto Protocol." [Retrieved on Jan. 7, 2011]. Retrieved from the Internet <URL: http://msdn.microsoft.com/en-us/library/aa767737(v=vs.85).aspx> (4 pages).

Objective Development. "Launchbar Instant Send." [Retrieved on Jan. 7, 2011]. Retrieved from the Internet <URL: http://www.obdev.at/resources/launchbar/help/InstantSend.html> (3 pages).

Objective Development. "Performing Web Searches." [Retrieved on Jan. 7, 2011]. Retrieved from the Internet <URL: http://www.obdev.at/resources/launchbar/help/PerformingWebSearches.html> (3 pages).

Raskin, Jef. "The Humane Interface: New Directions for Designing Interactive Systems." ACM Press, 2000. (7 pages).

\* cited by examiner

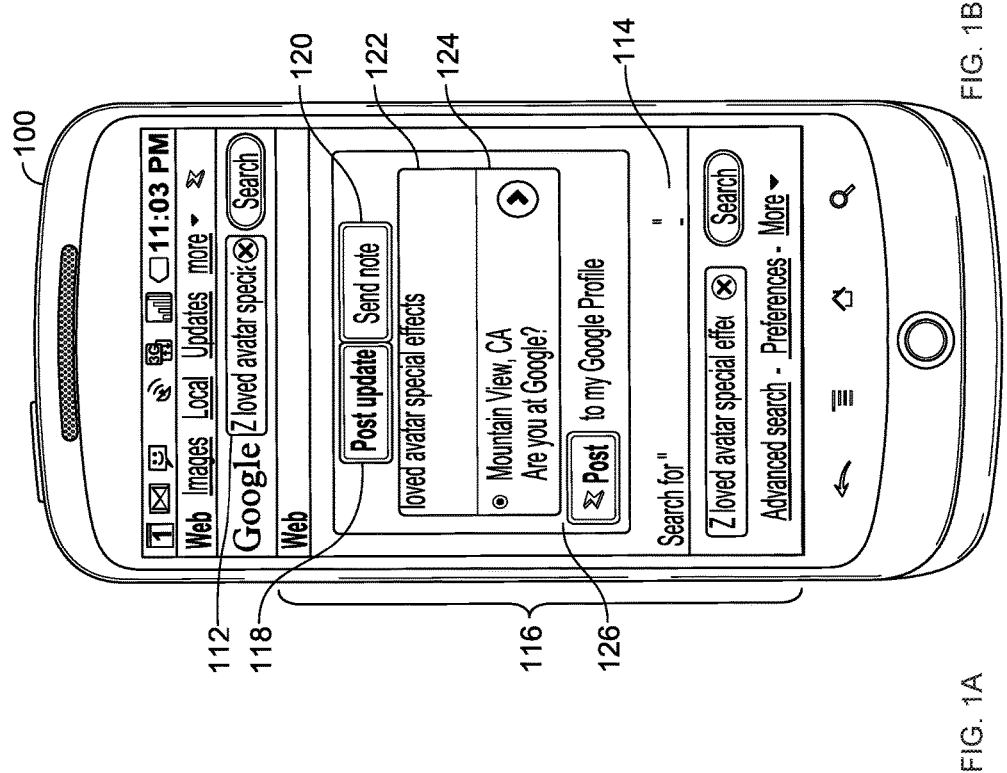

IDENTIFYING NON-SEARCH ACTIONS BASED ON A SEARCH-QUERY

CROSS-REFERENCE TO RELATED APPLICATIONS

This application is a continuation of and claims priority to U.S. application Ser. No. 14/150,330, filed on Jan. 8, 2014, entitled "Identifying Non-Search Actions Based on a Search Query" which is a continuation of and claims priority to U.S. application Ser. No. 13/022,755, filed on Feb. 8, 2011, entitled "Identifying Non-Search Actions Based on a Search Query" which claims priority to and benefit of U.S. Provisional Application Ser. No. 61/302,955, filed on Feb. 9, 2010, entitled "Executing Actions From a Search Box," the entire contents of which are hereby incorporated by reference.

TECHNICAL FIELD

This document is generally directed toward search.

BACKGROUND

Search engines make the world's information readily available to computer users. Generally, search engines operate by a user typing or speaking a query, and the search engine returning one or more search results that are determined to be most responsive to the query. An effective search engine can deliver the most relevant results in response to a user-submitted query so that the user can quickly obtain answers to whatever question the user submits. Computer users often perform dozens of searches per day.

Computer users also frequently send messages to one another or use other computer applications. In certain circumstances, the applications can obtain information over the internet, or be operated over the internet as web apps. Such applications may, for instance, include electronic mail applications that allow users to store their e-mail messages on central server systems, and to access their messages from internet-connected networks.

SUMMARY

This document describes techniques by which actions normally associated with software applications can be invoked and controlled from a query entry area for a search input field. Various actions may be instituted from such a query entry area, including the sending of micro-blog posts, the sending of electronic mail messages, the posting of blog entries to a web page, and similar actions. A user may express an intent to initiate an action rather than simply to obtain search results by including in a query a reserved word or character. A search front end may then see such a character or word, and may interpret the presence of the character or word in the query as a signal to route the query to a messaging server or service in addition to, or instead of, to a search engine. Other signals from the user may cause the search front end to route content from the query to other services or servers so as to have other actions carried out.

The search front end may cause code to be sent to the user's computer so that the user can confirm that they would like to perform the action that the system interpreted their query as requesting. The user may then confirm the intent, or may indicate that a different action was intended, and may also edit the message that they originally submitted with the query, and that the system extracted from that submission. The system may, along with the confirmation opportunity, provide the user with search results directed to the message that was in the user's query. Such search results may be helpful when the user actually did intend to enter a search query, and not perform another action. Such results may also be helpful in that the user could incorporate content from the results or from landing pages or other resources to which the results are directed, into the message before confirming that the message should be sent.

In general, one aspect of the subject matter described in this specification can be embodied in a computer-implemented method for invoking a non-search action based on a search query. The method includes receiving, by a computing device, a search query that includes a reserved term that indicates an intent by a first user that submitted the search query to the computing device to perform a non-search messaging action. The method includes transmitting, by the computing device and to a search engine system that determines whether the search query includes the reserved term, the search query. The method includes receiving, by the computing device and from the search engine system in response to transmission of the search query, a draft message that includes the search query with the reserved term removed from the search query. The method includes displaying, by the computing device, the draft message. The method includes receiving, by the computing device, user input that indicates an intent of the first user to transmit the draft message to multiple users of a social network that have requested to receive social network posts that are authored by the first user. The method includes transmitting, by the computing device and to a social networking system in response to receiving the user input to transmit the draft message, the draft message so as to cause the social networking system to transmit the draft message to the multiple users Another aspect of the subject matter described in this specification can be embodied in a computer-implemented method for invoking a non-search action based on a search query. The method includes receiving, at a server system, a search query from a remote computing device. The method includes determining, by the server system, whether the search query includes reserved text that indicates an intent by a user that provided the search query to the remote computing device to perform a non-search messaging action instead of or in addition to obtaining search results. The method includes providing to the remote computing device, by the server system in response to determining that the search query includes the reserved text, code for: (i) causing the remote computing device to display a draft communication that includes at least the search query without the reserved text, and (ii) allowing the user to edit the draft communication before transmitting the draft communication for receipt by recipient users.

Additional aspects can optionally include one or more of the following features. The draft message can be displayed by the computing device in an input field. The method can include receiving user input, by the computing device, modifying the draft message that is displayed in the input field. The search query may not identify the multiple users. The computing device may not receive, after receiving the search query, user input that specifies the multiple users. The method may include receiving, by the computing device and from the search engine system in response to transmission of the search query, search results that include search results that identify documents that are responsive to the search query with the reserved term removed. The computing device may display the search results and the draft message concurrently. The method may include displaying by the computing device concurrently with the display of the search results and the draft message, a user interface element that when selected causes the computing device to replace the concurrent display of the search results and the draft message with a second display of second search results that identify documents that are responsive to the search query with the reserved term. The second display may not concurrently display the draft message.

The message may include providing, by the server system and to the remote computing device, second code for generating a search query submission input field. The search query that is received at the server system may have been typed into the search query submission input field. The search query may be received at the server system as a sound file. The method may include converting, by the server system, the sound file to one or more words of text. The method may include receiving, by the server system and from the remote computing device, a confirmation that the user would like the draft communication to be transmitted to multiple users of a social network that have an acquaintanceship relationship in the social network with the user.

The code may further cause the remote computing device to display a graphical user interface element that, when selected, causes the draft communication to be transmitted to multiple users who have indicated an interest in following posts from the user of the remote computing device. The search query may not identify the one or more users. The code may further cause the remote computing device to display, concurrently with the draft communication, first search results that identify documents that are responsive to the search query without the reserved text. The code may further cause the remote computing device to display, concurrently with the draft communication and the first search results, a user interface element that when selected causes the remote computing device to replace the display of the first search results with a display of second search results that identify documents that are responsive to the search query with the reserved text included. The code may further cause the remote computing device to display, concurrently with the draft communication and the first search results, a graphical user interface element that, when selected, causes the draft communication to be transmitted to one or more recipient users.

Another aspect of the subject matter described in this specification can be embodied in a computer-implemented searching system. The system may include a search engine to provide search results in response to search queries received from computer users who are located remotely from the search engine. The system may include a search front end programmed to determine whether a search query received from a user indicates that the user intended to perform a non-search messaging action instead of or in addition to obtaining search results from the search engine. The system may include a messaging sub-system in communication with the search front end and programmed to transmit content from search queries that the search front end determines to have been intended to perform a non-search messaging action.

In yet another aspect, the subject matter described in this specification can be embodied in a computer-implemented searching system. The system includes a search engine to provide search results in response to search queries received from computer users who are located remotely from the search engine. The system includes means for determining whether individual search queries are intended, by users who submit the queries, to generate search results or to invoke a non-search messaging action in addition to or instead of generating search results. The system includes a messaging sub-system in electronic communication with the means for determining and programmed to transmit content from search queries that the means determines to have been intended to perform a non-search messaging action.

Additional aspects can optionally include one or more of the following features. The system may include a search results interface programmed to prepare code for generating an interface to present a proposed non-search messaging action to the user in response to receiving the search query from the user that the search front end determines indicates that the user intended to perform a non-search messaging action, and to receive user confirmation of an intent to perform the non-search messaging action. The message may include a search page generator to display search query input fields for receiving user input of the search queries. The system may include a speech-to-text converter programmed to convert audible search queries received from users to textual search queries. Determining whether the search query received from the user indicates that the user intended to perform a non-search action may include identifying a reserved term in the search query received by the search front end. The non-search action may include transmitting text from the search queries to one or more users who are associated with particular users who submit the search queries.

The details of one or more embodiments are set forth in the accompanying drawings and the description below. Other features and advantages will be apparent from the description and drawings, and from the claims.

DESCRIPTION OF DRAWINGS

FIGS. 1A and 1B are screen shots of a mobile device receiving messaging input in a search input field.

Like reference symbols in the various drawings indicate like elements.

DETAILED DESCRIPTION

Figure 1C:
FIGS. 1C and 1D are partial screen shots of a computer receiving messaging input in a search input field.

This document describes systems and techniques by which users of a computing system may perform actions other than retrieval of search results via a search engine interface. In particular, a user may indicate an intention to perform a non-search action, such as by typing a reserved word or character into a search query input field (e.g., a search input text box), and may also optionally type a message or other action that is associated with the activity they would like the computer system to take. For example, the user may want to send a message (e.g., via text message, e-mail, or micro-blog) from the search input field of a hosted search engine (either from the home page of the search engine or from a search input field in a toolbar from the search engine provider or another search input field associated with the provider), and may signal such an intent by starting their entered query with the letter "z" and a space. A central search engine system may interpret this input as being directed to posting a message for the user, and may form the message from whatever string of text the user types after the reserved character "z".

FIGS. 1A and 1B are screen shots of a mobile device receiving messaging input in a search input field, in a manner like that just discussed. In FIG. 1A, a user is in the process of entering text into a GOOGLE search input field, such as on a mobile version of the GOOGLE home page 102. An input method editor on the user's mobile computing device (e.g., a smartphone or app phone) has displayed a virtual keyboard 104 to assist the user in entering a query into the search input field 106 of the home page, which may be a standard search input field (though with the additional functionality on the back end described in this document).

In this example, the user has typed the letter "z" followed by a space. To this point, the search engine treats the entry, for the most part, as a typical query entry and provides a list of completions or suggestions in a drop down box below the search input field (or query entry input field). In this example, the entry "z gallerie" 110 is provided, indicating that other users may have searched before for "z gallerie" more often than they have searched for any other topic that begins with a "z" and a space. If the user selects that entry, the device will initiate a search on "z gallerie." The suggestions may also integrate past activity by the user of the device 100 also, and may weight prior search queries entered by that user higher than prior search queries entered by other users.

An additional item 108 has also been displayed below the search input field 106 because a remote search engine service has recognized "z" as being a reserved character that users employ to indicate their intent to have the system that delivers search results perform a non-search action. That item 108 is expressed as a hyperlink labeled "Action>>", and its selection may cause additional information to appear about non-search actions that are available to the user. For example, a list of such actions may be displayed to the user, so that the user may select one of the actions, and may then interact with the system to provide additional information needed to perform the action. Alternatively, the user may simply continue typing a query in the search input field 106 and submit the query in an ordinary manner.

When the user does so, the display of FIG. 1B may be generated on the computing device 100. (The same or another action-based display can be generated if the user selects the "Action>>" hyperlink.) Here, the original home page 102 has been replaced on the device 100 with a result page 116 that has been generated based on the remote search engine's recognition that the user indicated an intent to send a message in the form of a micro-blog post. The result page 116 shows an interactive content posting item, where the portion of the query submitted by the user after the "z" (i.e., "loved avatar special effects") has been inserted as default text for a post. The text appears in an input field where the user can add to it or otherwise edit it.

Two controls 118, 120 are displayed above the input field—a first control 118 that the user may select to have the text in the input field posted as a micro-blog update, such as to start a conversation stream, and a second control 120 that the user can select to have the text sent to the user himself or herself. The latter option essentially implements a "note to self" feature, where the note can be delivered as an email message to the user, can be added to a collection of such notes at a location that the user can access on-line, or by other mechanism. Thus, if a user has a quick idea he or she wants to remember, the user can simply jot it down in a toolbar search input field that may be in front of the user all the time (i.e., either in a complete toolbar, in a system tray of an operating system, or in another similar, relatively persistent location). The user can then locate a common document or search through messages in an email inbox in order to collect all such thoughts.

Search entry may also occur by other modes that are essentially persistent (i.e., are available readily to a user for a sufficient amount of time, and in a manner, so that a typical user comes to expect them to be readily available (e.g., without launching a new application) at all times, or at least when a browser is open or a search program is listening. Thus, a desktop search input field on a smart phone may cause interaction in a manner like that described in this document. Similarly, voice input to a search engine may operate similarly, though the particular syntax for speech input and typed input may need to differ. The particular syntaxes generally should be chosen so as to provide adequate usability and interaction in each of the various search query entry modes available to a user. For example, a syntax or syntaxes should work with voice and typed input. Also, user interaction may be more complete where the user interacts with a web page, but less complete when the user interacts with a search running under an operating system on a user's computing device.

Referring now again to FIG. 1B, a separate post button 126, when selected, causes the text to be posted to the user's profile. A profile is a location where various information about a user is stored and can be accessed by other users (e.g., friends or all other users, depending on the security settings for the profile). The profile, among other things, can display a list of posts submitted over time by the user.

The screen of FIG. 1B also shows a follow-up search input field 112 and search and selectable control. Such on-screen elements may be employed when the user did not really intend to create a post from his or her query submission. The user can simply select the control to have the same screen shown to them again, or can amend the text in input field 112 and then select the control in order to have an amended submission sent to the search system (which submission may omit the "z", and thus generate a traditional search results page). A hyperlink 114 for the submission may also be selected by the user in order to have a search conducted rather than an action prepared for the user. Other elements on the screen can provide the user with other options to submit the query also.

The post by the user, as with most any post by the user—particularly on a mobile computing device—may be correlated to a location of the user. In this example, element 124 provides the user with an opportunity to identify the venue at which they are located so that their post can be tagged with that venue and associated with it. In this example, the device 100 has provided GPS coordinates to the remote search system, which has in turned inferred that the venue of the user is the GOOGLE campus in Mountain View, Calif. If the user confirms the venue by clicking on it or on the caret to at the element's right edge, the post will then be tagged with that location or venue. Thus, for example, an icon may appear on a map view of a messaging application used by someone who is "following" the user in a social networking application, and such other users can click on the icon to see the user's post. Also, in this manner, posts relating to particular venues (especially restaurants, bars, and similar venues) may be organized and viewed by the venue itself.

Figure 1D:
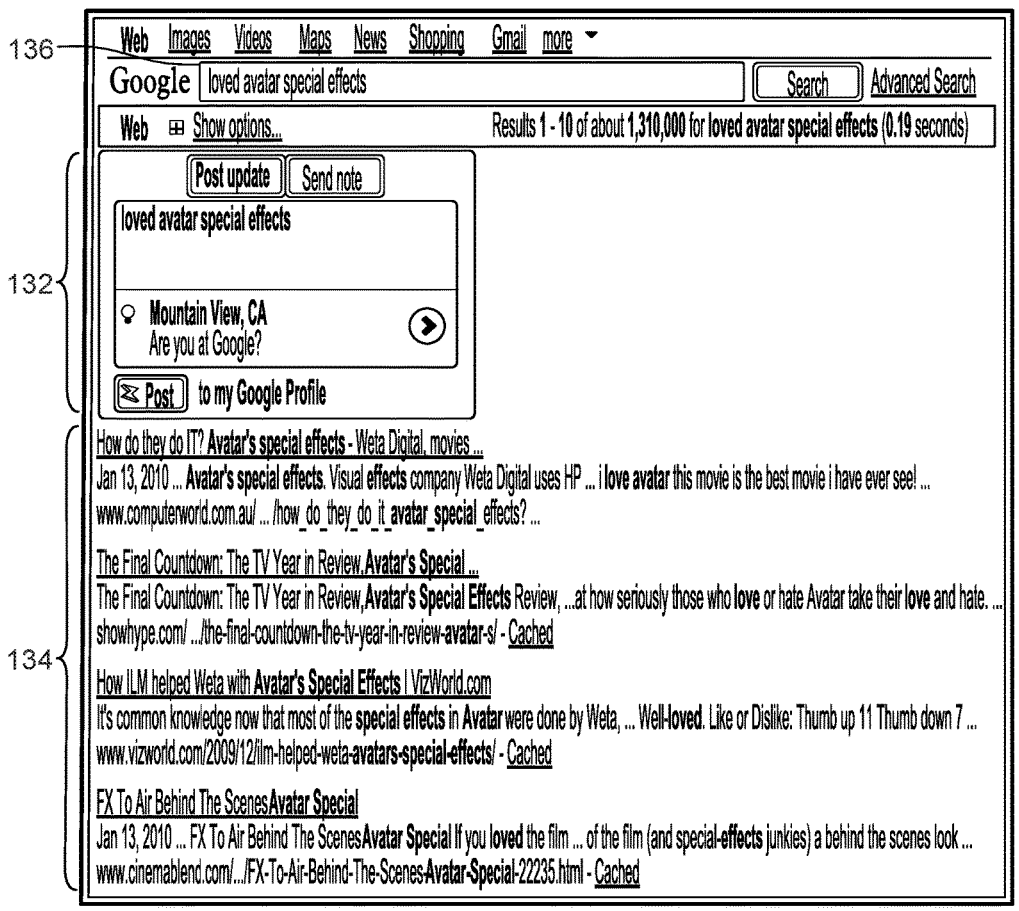

FIGS. 1C and 1D are partial screen shots of a computer receiving messaging input in a search input field. The example shown by these figures is similar to the example of FIGS. 1A and 1B, but is presented on what is presumably a larger display, such as on a browser being presented on a display of a desktop computer. Although a separate search input field outside the browser presentation is not shown here, the text discussed here could be submitted to the search system via such a different type of search input field.

FIG. 1C shows the familiar GOOGLE search home page, where a user has entered the query "z loved avatar special effects" into the search input field 130—just as in the mobile computing example above. FIG. 1D shows the results page delivered to the user when the user submits the query. Here, the text of the query with the reserved character z removed, has been presented in a search edit input field 136 so that the user can choose to submit the text (either with or without further editing) simply as a search.

In addition, though, the presence of the reserved "z" character in the query has indicated to the search system that the user might want to post to a social messaging service the message that followed the "z." Thus, a communication element 132 is displayed above a list of search results 134. The element 132 takes the same form as the element shown in FIG. 1B, though it could also take other forms when the system determines that a user is on a larger-screened, non-mobile device. The functionality of the element 132 is like that described above for FIG. 1B.

In this desktop example, because there is additional room on the screen, the system has also delivered a list of search results 134. Such a list may enable the user to review the results without having to take additional actions if the user really did intend to conduct a search, and just happened to enter the reserved character. Also, even if the user did intend to perform the non-search activity, the presence of the search results 134 can enhance that activity. For example, a user may find information about the query topic that complements the text they had planned to send, and may use the search results 134 to add that information to their post. As one example, the user can easily paste a URL for one of the search results into their post or into an area of element 132. The system may then extract information from the page at the URL that is believed to be highly relevant, such as headings, page titles, and images, and may present the extracted information to the user. The user may then select certain of the items from the page to add to his or her post. In this manner, the combination of search activities and messaging activities may be used to conveniently generate a message that is much richer than the user could generate simply by typing a post.

Also, although the examples here are directed toward posting of an event for consumption by followers of the user, other actions may also be initiated from a search input field in manners similar to those shown here. For example, a user could send an email to a friend from the search input field by typing a syntax such as "z friend@example.com Bob, do you want to have lunch?" If the user could not remember the full email address for the friend, they could type "z @friend Bob, do you want to have lunch?", and the system could identify other users associated with the user (e.g., they are in the user's contact list, are followers of the user in a micro-blogging system, or are friends in a social networking system) who have the name "friend" and could add their contact information to an email. In a follow-up screen like that shown in FIG. 1D, a mostly-completed email message may be shown to the user in the space occupied by element 132, and the user may change the recipient of the email, the text of the email or other information.

The syntax of the submitted query may also expressly indicate the activity that a user wants to invoke. For example, the letter "z" may precede intended micro-blog posts, the letter "e" may precede intended email transmissions, and other reserved letters may precede other actions.

The system may also identify which action a user indicates, from among a plurality of actions that could be indicated by a user submission to a search input field, using the context of the other parameters that the user submits. For example, if the message submitted by the user is a simple declaration, the system may infer that the user intends a micro-blog post. If the message includes a personal name, the system might infer that the user intends to send an email message (under a rule of thumb that personal names are likely to be private in nature). If the message includes a keyword that is highly linked to a particular service that the system provides, the message may be interpreted as being directed to an action for that service.

Alternative desktop presentations (as opposed to mobile presentations) may also be used. For example, the interaction with a user who appears to be intent on performing a non-search-related action may occur through a suggestion box that pops up or down from a search input field as a user enters search terms. If the user enters a reserved term that indicates an intent to perform an action, the suggestion input field—in addition to displaying a list of possible completed submissions—can also include selectable entries relating to the actions. For example, the suggestion input field could list, at its top or bottom, "post this entry" and "note to self" so that when the user has typed the message that he or she wants to type, the user could simply select one of those options to have their message sent, and without having to wait for a separate page to be transmitted and generated. A submission button and/or other controls could also be generated and displayed within the suggestion input field.

Using the techniques shown in FIGS. 1A through 1D then, a user may be provided with a mechanism by which to achieve actions using a hosted computer system that provides search services and a variety of other services. The search input field for such a service may be ubiquitous for the user, and may be displayed in many different instances to the user, including via persistent display in an operating system of a computing device. A user may thus employ the search input field to perform non-search activities, so that the user can avoid having to change the focus of their computing device to computer applications for such other activities, or have to wait to launch such applications. The syntax for invoking such activities may also be made simple so that invocation of the activities is relatively simple and easy for a vast array of users to remember and employ. Also, appropriate feedback may be sought from the user, particularly where the system would not want to invoke an activity that the user did not truly intend, so that unfortunate messages are not accidentally sent by the user.

Various other non-search actions may also be initiated by a user through a search query submission input field. For example, a user may add a task to their or another user's task list (e.g., by typing "z finish version 2 of software project"), or perhaps using "t" as the reserved character for "Task." In a similar manner, a calendar event may be added to the user's on-line calendar—such intent by the user may be inferred by the presence of a date in the user's submission, and a general syntax of the submission that indicates the submission is intended to be for a calendar rather than a message to other users. Also, a simple text message may be sent to a single other recipient. In addition, a prefix other indication may be included for search-related actions, such as to search only materials related to the particular user (e.g., searching the user's word processor documents stored online, or searching the user's contact list). A user could also use such formatting to begin the creation of a restaurant reservations (e.g., typing "res Olive Garden 7 pm tonight for 2")—a results screen may then be delivered to the user to let them finish provided information necessary to complete the reservation. Moreover, a user could initiate a telephone call such as a VoIP call from the search input field, such as by typing "z 555-1212" or "call mom."

Such submission may also be supported for voice-submitted queries. In such a situation, the user's device or a remote search service may initially determine from the user's voice commands whether the user intends to conduct a traditional search, or instead to perform a non-search action. Various operation syntax modes may be employed for various situations, particularly to address both typed and spoken input. For example, in a verbose mode (intended for spoken input) with results page confirmation, the syntax can take the form [verbose action trigger]+[action arguments and payload]. One example is "Note to self pick up milk and bread," where the first three words are the action trigger and the remaining words are the action arguments and payload. In other examples, the action arguments may include time/date for a calendar entry, a recipient for email, and the like.

A second mode may involve a fully qualified syntax with results page confirmation. Such a mode may take the form "z"+[action]+[action arguments and payload]." An example includes "z note pick up bread and milk" or "n pick up bread and milk," where "z" indicates an intent to perform a non-search action, and "note" or "n" indicate that the type of action is to record a private note for the user who is submitting the query or command.

A third mode is an abbreviated syntax mode, like that discussed above in FIGS. 1A through 1D, in the form "z"+[action arguments and payload]. An example includes "z pick up milk and bread". The user may then be shown a ONE BOX for performing the action that was inferred by the user, and the user can disambiguate the action that the user intended. The default action can be inferred from the payload content or can simply be the last action the user used. In this mode, the user does not have to remember action parameters, though the user may be required to provide added follow-up information because the user's intent is more ambiguous in this mode than in the others. In other situations, a payload may include a term that is reserved as an action term, and a user may be provided with an opportunity to confirm what they intended the term to represent.

In a fourth mode, various custom user interfaces may be implemented. For example, in a desktop presentation, a user may be presented with various options form which to select immediately after they have typed "z" or some other reserved preceding term. The user can then confirm the action, such as right in a suggestion drop down box, and may add parameters and a payload in an interactive manner. Such user interaction may then be formatted automatically on their device and forwarded to a remote search service, which may in turn parse the submission apart and forward it to the appropriate non-search services.

In addition, the triggering syntax may differ depending on whether the user is submitting a query via typed input or voice input. For example, with typed input, the user may type a single reserved character followed by a space—an action that is relatively easy to remember and easy to invoke. Such a character or reserved word should generally be selected as one that does not typically start a typed query. However, for voice input, full words may be used as triggering signals, since such words can be much easier to speak than they are to type. As one example, a user who is presenting orally to a voice search system may start a submission by speaking "post buzz," and then following by speaking the content of a message they would like to post to a micro-blogging service.

Figure 2A:
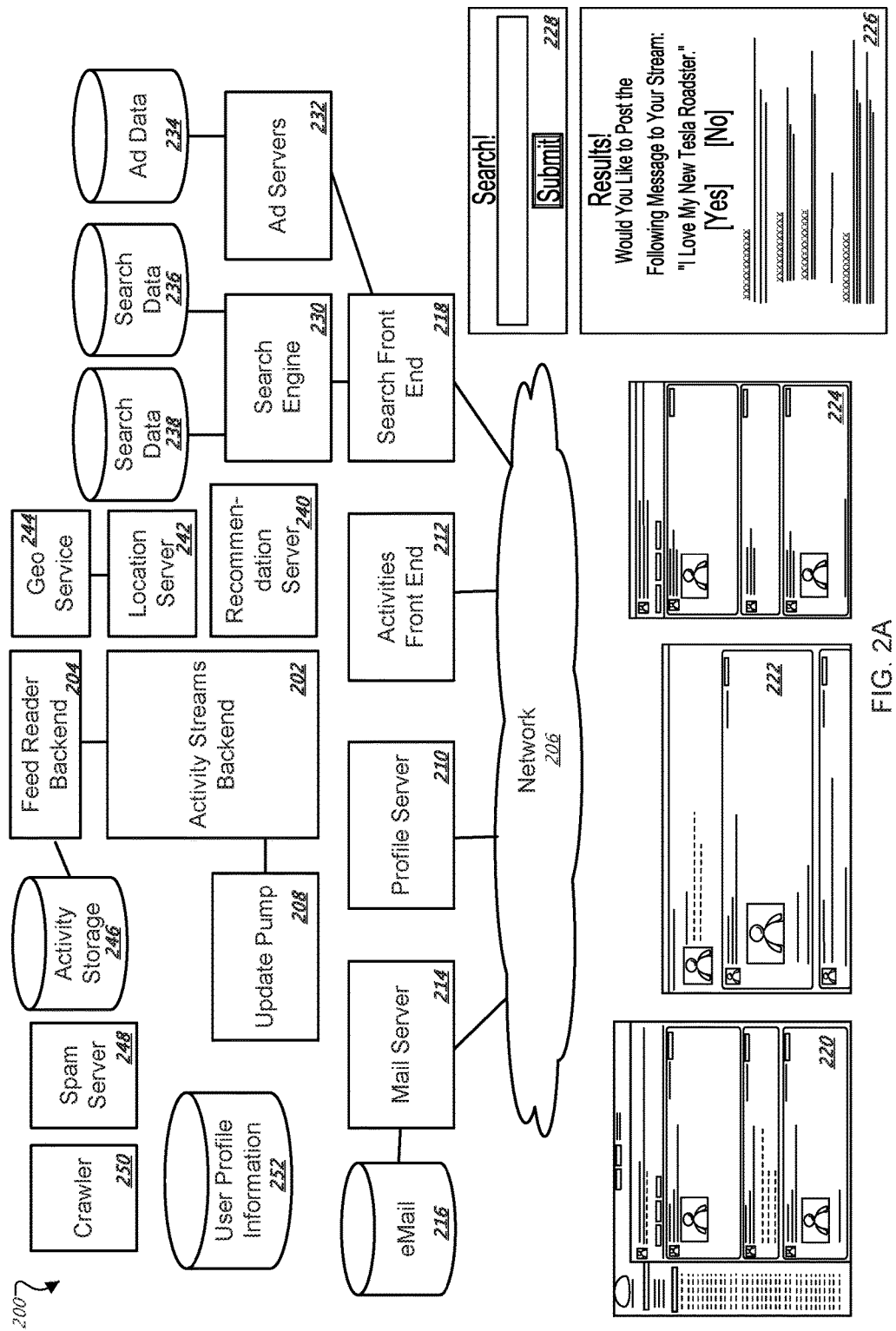
FIG. 2A is a schematic diagram of a system within which the various features described in this document may be implemented.

FIG. 2A is a schematic diagram of a system 200 within which the various features described in this document may be implemented. In general, the system 200 permits various users to post, review, and comment on various activity streams of information, within a social networking framework. For example, a user may make a micro-blogging post about a recent happening in the user's life or about a news article the user recently read. That post may be forwarded to other users who have chosen to follow the first user (who may be an individual or an organization). Those other users may see the post using a stream reader, or the post may be displayed in their email applications (e.g. either in line with their regular email messages or under a separate tab). Those users may choose to comment on the post, and other users may also comment on the post or comment on the comments of other users. Such comments may be included and shown in the various users email application even if they were made after the post was originally connected to the email application. Thus, the various types of feedback may be made available to each user conveniently in one place. Users may also see posts related to other users my visiting profile pages for those other users, and may also go to their own profile pages or to their stream pages to see all of the posts and comments for posts to which they are subscribed.

The various posts, and comments on posts, are managed in the system 200 by an activity streams backend 202, which is in charge of implementing business logic that defines the manner in which various submissions to the system 200 will be handled. The activity streams are characterized by activities, which are the subjects of posts (e.g., micro-blog posts) that users submit to the system 200, and various comments directed toward those activities. For example, a user may post an activity regarding a web page they are currently viewing by pasting a URL of the page into a posting page. Such action may cause the system 200 to gather important information form the URL, including images displayed on the page, headings, labels for images, or topical terms that describe a topic of the page (e.g., as previously determined by analysis of the words on the page, such as using AdSense analysis of the page). The system 200 may also obtain location information, such as the current location of the user, and/or a venue with which the user is most currently associated (e.g., that the user checked into recently or identified as a venue in which the user is located).

The activity streams back-end 202 also implements logic for determining what users are to receive posts, comments on posts, and other portions of streams in the system 200. In particular, users who have subscribed to receive posts form other users may be provided with posts when they log into the system 200, users may nominate other users to receive copies of streams when those other users would not ordinarily be included in the streams (e.g., by typing in identifiers for those other users when reviewing a post), and users may send streams directly to each other, among other things.

The feed reader back end 204 manages storage of posts and related data for the system 200. The feed reader back end 204 may rely on various levels of activity storage 246 to store posts, comments, on posts, and other information needed to construct streams for users when they request information from system 200. As with the other components shown in this figure, the feed reader back end 204, though shown as a single block, can be implemented using a number of different servers or server sub-systems. Likewise, the activity storage 246 can be implemented across a number of databases and database types, and across a variety of servers and server sub-systems.

When posts or other updates are received by the activity stream back-end 202, they are formatted and provided to update pump 208. The update pump 208 is responsible for provided notices about newly-posted information to various services that may need such information. It acts, in effect, as a router and distributor of information relating to the system 200. For example, a mail server 214 may include functionality for integrating the display of streams, and may thus need to know about new posts so that users of a mail client can be shown immediately when new information is posted. In a similar manner, a search engine 230 may provide search results to users that include real-time updating information from various posts that users are supplying to the system, and can receive such updated information by interacting with the update pump 208 via understood APIs and remote procedure calls (RPCs) where the two components are sub-components of a larger organization-wide system.

Various web front-ends are provided to permit the system 200 communicate over a network 206, such as the internet (and adjacent supporting networks). For example, the mail server 214 may provide typical web-based electronic mail functionality, though with the integration of posts and comments into users' in boxes, via a mail client 220. For example, streams may show up as discrete messages in user's inbox, and may be updated in real time to include the latest comments on the streams and originating posts for the streams. Such content may be active, in that a user may be allowed to interact with it substantially to a level that they could if they were reviewing the streams in a dedicated stream reader. For example, selectable controls may be provided with a stream that is displayed by the email client 220, and a user may choose one in order to post a comment to be added to a stream, without having to leave the context of the message within the email client 220.

A profile server 210 generates code for representing user profiles such as profile 222 of user John Smith. The profile page may take the form of a standard feed page from a social networking site, arranged with a list of posts and comments from other users in reverse chronological order. In a similar manner, an activities front end 212 can generate a similar feed for a user's feed page 224, here for a user named Susie User. The profile page 222 and the feed page 224 may be very similar to each other, and can present content similar to that presented as part of a posting or micro-blogging section of mail client 220. In one example, the profile page 222 is what third parties see when they look at the user's account, while the feed page 224 is what the user himself or herself sees.

A search engine 230 and associated search front end 218 may provide a different sort of functionality for the system 200. Specifically, the search front end 218 may allow users to provide posts or comments from non-traditional sources, such as search input fields, e.g., on a search web page or in a search input field on a toolbar installed on their machines an operating in concert with their web browsers. Such posts or comments may be submitted by users and may be received by the search front end in a standard manner, just as search requests are. The intent of a user to submit a post rather than a search query (or in addition to a search query) may be determined by syntactical analysis of the submission. In one example, if a query is preceded by the letter "z", with a space after it (see screen 228)—a construct that is seldom submitted as a real search query—the system may parse the submission apart and assume, from the syntax, that the user intends to post the remainder of the submitted query as a post to their social network.

Such a post may be made immediately or after confirming with the submitting user that they would like to make a posting. For example, a search results page 226 may be generated that contains actual search results for the submitted query (whether with or without the preceding "z") generated by the search engine 230 using data from index 238 in a conventional manner, and may be displayed below an area that shows the user the form of a proposed post and selectable controls by which the user can edit the post and can then confirm an intent to post the information to friends, followers, or others. The post may then be forwarded by the search front end 218 to the activity streams backend 202, along with identifying information for the user (e.g., a user ID identified from a cookie on the user's computing device when the user is logged onto a broader service that implements the system 200).

The search results and other information may be accompanied by targeted advertisements directed to the search query or other similar information, such as profile information, the text of posts or comments by a user, the text of posts or comments of users who have a relationship with a user (e.g., as friends, followers, or users that the first user follows). Such advertisements may be served, through the search front end 218, or the other front ends 210, 212, 214 to users of the system 200 and may be targeted using techniques like those employed in GOOGLE ADWORDS OR ADSENSE. Such serving of advertisements may depend on ad data in database 234, which may include information about advertisers, the text and other content for the advertisements, bid prices submitted by the various advertisers, and other relevant information needed to serves advertisements that are directed to users and/or streams of information directed from or to the users.

Various location-based services may be integrated with posts or comments, such as by identifying the locations (e.g., latitude/longitude coordinates) or venues (e.g., stores, arenas, bars, or restaurants) from which posts or comments are made. Such services are provided in this example system 200 by a location server 242 and geo service 244. The location server 242 generally provides information about venues or other landmarks in response to receiving location information about a user of system 200. For example, when a user submits a post, geo-coordinates for the user may be provided with the post (e.g., via GPS functionality on the user's mobile computing device) or may be determined for the user by the system 200 (e.g., via cell tower or access point identification or triangulation). The geo-location information may be an estimated latitude and longitude of the mobile computing device and information identifying an accuracy of the estimation. The location server 242 may be made available through an API to various other components of the system 200.

The location server 242 may use such geo-location information to identify one or more venues (e.g., stores, restaurants, or bars) in the general location of the user, may use proximity of the user to each venue and other signals (e.g., popularity of each venue as determined from search queries submitted with the venue name, check-ins at the venue by users of the system 200, a volume of activity associated with posts from the venue, a reputation of a post's author, for example, through number of subscribers, a volume of comments on posts, or a similarly determined reputation of the subscribers) to provide a ranked list of venues in the geographic area that the user may be in. The user may be presented with a single suggestion for a venue or several suggested venues. The user may then select one such venue, and that venue may be associated with the post when other users review it. For example, the post may be accompanied by meta data indicating that the post was "Posted from Dive Bar," and other users may select the name "Dive Bar" to see additional information about the venue, including other posts from the venue, ratings of the venue, streams that belong to the venue (e.g., if a manager of the venue has made the venue a user of the system 200) and other similar information.

The location server 242 may obtain information that it needs to provide such functionality from various external services, such as geo service 244. Geo service 244 may be a service that communicates via standard APIs to receive location information (e.g., lat/long coordinates) and to provide more advanced information in response. The more advanced information may include a street address that is determined to be associated with the lat/long coordinates (e.g., a street address that is nearest to a particular location represented by the lat/long coordinates). The more advance information may also include a list of venue names that are geographically near the particular location, street addresses for the venues, descriptive information for the venues, map tiles that are associated with the particular location, and a relevance score for each venue. The relevance score for each venue may identify how relevant the particular venue is based on any combination of (i) the received location information, (ii) an accuracy of the received location information, and (iii) a distance between the venue and a location identified by the received location information.

Other components may interact with the components already described to provide additional functionality for the system 200. For example, a crawler 250 may crawl various posts and comments for the purpose of indexing the content in the system 200, so that, for example, search engine 230 may readily deliver search results that include the latest postings by users to the system 200. Also, spam server 248 may communicate with the activity streams backend 202 and/or the update pump 208 to identify posts or comments that may be inappropriate (e.g., offensive, abusive, or otherwise inappropriate), duplicative, deceptive (e.g., in which one user poses as another user), and to act appropriately with respect to such content (e.g., providing for automatic and/or manual review of the content and perhaps removing the content from the system 200 or making the content hidden).

Finally, a recommendation server 240 may be provided with any new activity or post that is submitted to the system 200 (e.g., via the activity streams back-end 202). The recommendation server 240 may write back to the activity streams backend 202 about the number of people who should receive the activity. Such information may be saved so that the next time a message is sent out about the activity (e.g., a comment on the activity), the new recommended users also get the activity. A quality score can be computed when determining what users should receive an activity, and the score can be determined by factors such as the distance of relationship between a user and other users who have posted to or recommended an activity, interests of a user as identified in the user's profile (e.g., the user is a member of a classic cars group in a social network, and thus is more likely to receive notices about activities relating to classic cars), or interests as identified by posts or other submissions that the user makes, users or activities that the user follows, and the like. A quality threshold may be set by the recommendation server 240 in order to maintain an adequate level of recommendations (not too many and not too few).

Using the components described here, then, the system 200 may provide for integration of various modes of posting and receiving content that is provided in streams, such as micro-blog posts and comments on such posts. Users may post in various ways, including directly into search input field on search pages or toolbars, so that such users may be more tightly integrated into systems provided by the providers of the pages or toolbars, and may provide posts in contexts with which they are already very familiar. Also, the users may review posts and other content in their email client, also in a manner that is already familiar to them and does not require them to leave a familiar application in order to review such posts. Moreover, the content may be rich for the users, such that it may include information about locations and venues at those locations (from which a reader of the content may obtain additional information, such as from hyperlinks provided in posts), and the users may respond to posts in-line, such as from their email applications. In all these, ways the system 200 may provide a communication facility that allows a user simpler and more complete interaction with friends and with other users, and may increase the level of knowledge that is made available to the users of the system 200.

Figure 2B:
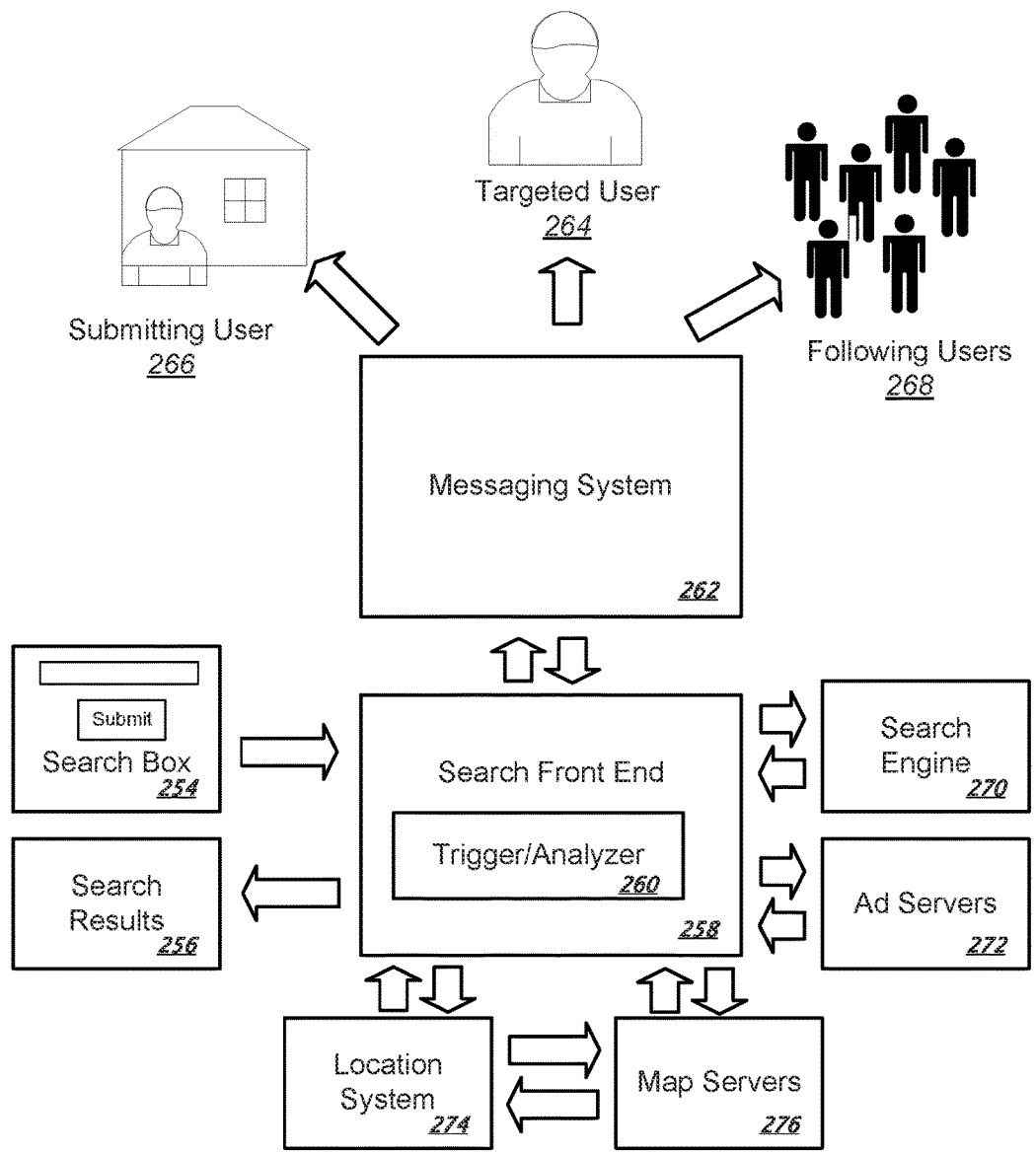
FIG. 2B is a schematic diagram showing interaction between a search engine sub-system and a messaging sub-system.

FIG. 2B is a schematic diagram showing interaction between a search engine sub-system and a messaging sub-system. The example system includes a search front end 258 that is in communication with a messaging system 262. The search front end 258 and the messaging system 262 may be executed by a server system. Each of these components may be implemented on separate server sub-systems at a particular organization. For example, the search front end 258 may generally be used by the organization to receive search queries from users and to provide search results (e.g., web, news, image, or other results) in a familiar manner. The messaging system 262 may implement various standard messaging services, such as electronic mail, text messaging, chat, and social messaging services (e.g., micro-blogging in which users subscribe to follow other users or objects in the system, and thus to receive posts from those other users or objects in a stream of content).

As shown, the search front end 258 serves as an interface between a search page and search input field 254 presented on a client computing device that is remote from the search front end 258 (which may be implemented using many servers working in cooperation with each other), and various services and server systems at the organization that presents search services. Normally, queries are received from the search input field 254 (which may be at the organization's web site, or via toolbars provided by the organization), are processed by the search front end 258, such as to rewrite the queries to make them more likely to produce quality search results, and provide to a search engine 270. Such processing may involve breaking up the search tasks into smaller groups and then assembling content and search results received back from various parts of the system. In addition, the rewritten query may also be sent to an ad server system 272, and ads may be returned to the front end 258 for presentation to a user, either with search results 256 or otherwise.

In this example, the search front end 258 is provided with a trigger/analyzer 260 that is programmed to parse incoming queries and determine whether those queries are directed to non-search actions. For example, as described above, a query may be preceded by a reserved character or word, and the trigger/analyzer may cause content from the query to be redirected to a service other than the search engine 270, such as to the messaging system. In some implementations, the trigger/analyzer 260 may also cause content from the query to be routed to the search engine in addition to the messaging system. In certain situations, the trigger/analyzer may identify a system, from among multiple services that are external to the search service, the non-search service to which the user's input is directed. Such a determination may be made, for example, by analyzing the content of a submission or the format of the submission, or a combination of both.

The information sent to the messaging system 262 may take a variety of forms. For example, the search front end 258 may simply obtain an identifier for the user of the search input field 254 (e.g., that was stored as a cookie for the user) and may send that along with the message the user included in the submitted query (with the reserved word or character removed). Where the submission is determined, for example, to indicate an intent to send an email, the search front end 258 may perform additional formatting of the message, such as by parsing an address of the email recipient apart from the text of the email, and sending them separately according to an established API to the messaging system 262 (which communication may occur, for example, using a remote procedure call (RPC)).

In this example, communications sent via a search query input field 254 may take three different forms. First, a message may be sent to the user 266 who is submitting the query content, such as in a "note to self" manner. The syntax for such a message may include the provision of the letter "n" or the word "note" in a query, such as after a reserved character or word. Second, a message may be sent directly to one or more other users who are specified in the submitted query. The syntax of such a submission may list the intended recipients, perhaps highlighted by preceded identifiers for the recipients with a character such as the "@" character. The identifiers for the recipients may be complete (e.g., they may be full email addresses for each user) or incomplete. The system may then resolve incomplete identifiers into complete identifiers. For example, if the submitted query includes the term "@joe," and the user has in his or her contacts list a friend named "Joe," the system may resolve the parameter to Joe's full email address. Such resolution may occur, for example, by the messaging system 262 or by the search front end 258.

In a third type of communication, a submitted message received from the search input field 254 may be broadcast to users who are "followers" of the submitting user. Such a messaging may be the default treatment of messages that are submitted to the search front end 258 with a reserved character or word. Such a communication mode is discussed above with respect to FIGS. 1A to 1D.

Geographic location-related information may also be incorporated into the messages provided by the system here. In particular, a location system 274, which may be implemented similarly to the location server 242 and geo service 244 of FIG. 2A, may provide for the geo-coding of messages, and particularly of broadcast posts, in the system. For example, when the search front end provides a confirmation screen to a user with search results 256, the system may make an estimate of the user's current location or venue, and may ask the user to confirm that location or venue or to select another. The system may also ask the user to consent to having the location associated with their communication, so that recipients of the communication can see from where it was sent.

The location system 274 and the search front end 258 may also refer to a system of map servers 276 in order to provide richer graphical presentation of location information. For example, when a user's location is being estimated, the search front end may serve to the search results 256 page a map showing the general area around the user so that the user can more accurately indicate his or her location, and can then optionally be presented with a list of venues at that location from which the user can select.

The general operation of the system can be better understood by tracking an example query submission by a user of the search input field 254. A string of characters may initially be received in the search input field 254, and may be transmitted by a computer client to the servers of the search front end 258. Along with other operations performed on the received query string, the trigger/analyzer 260 may parse the submission to determine whether a trigger indicating an intent to perform a non-search action is indicated in the submission. If such a trigger is identified, the search front end 258, either alone or in combination with the messaging system 262, may prepare a search results 256 page to interact with the user in performing the non-search action. For example, the search front end 258 may submit lat/long information received from the user's computer device (or IP address information received with the query) to the location system 274, which may return a list of venues at that location. The entries on the list and the ordering of the list may depend, for example, on how close the user is to each venue, the general popularity of the venue (e.g., as determined by general query logs and the number of times the venue appears in those logs). The location system may further obtain graphical map data from the map servers 276 in order to provide a more complete picture of the user's location.

The search front end 258 may then assemble a search results 256 page, which may include an element by which a user can edit whatever action was inferred by the system, and may also confirm that the action should be carried out. In addition, in appropriate circumstances, the user may be shown location information and may confirm whether they would like to change the information, and whether they would like it included in their chosen action. Moreover, in appropriate circumstances, classic search results may be returned to the user with all of this other information so that the user may review the results if they did not intend a non-search action or if they want to incorporate content associated with the results into their action.

Figure 2C:
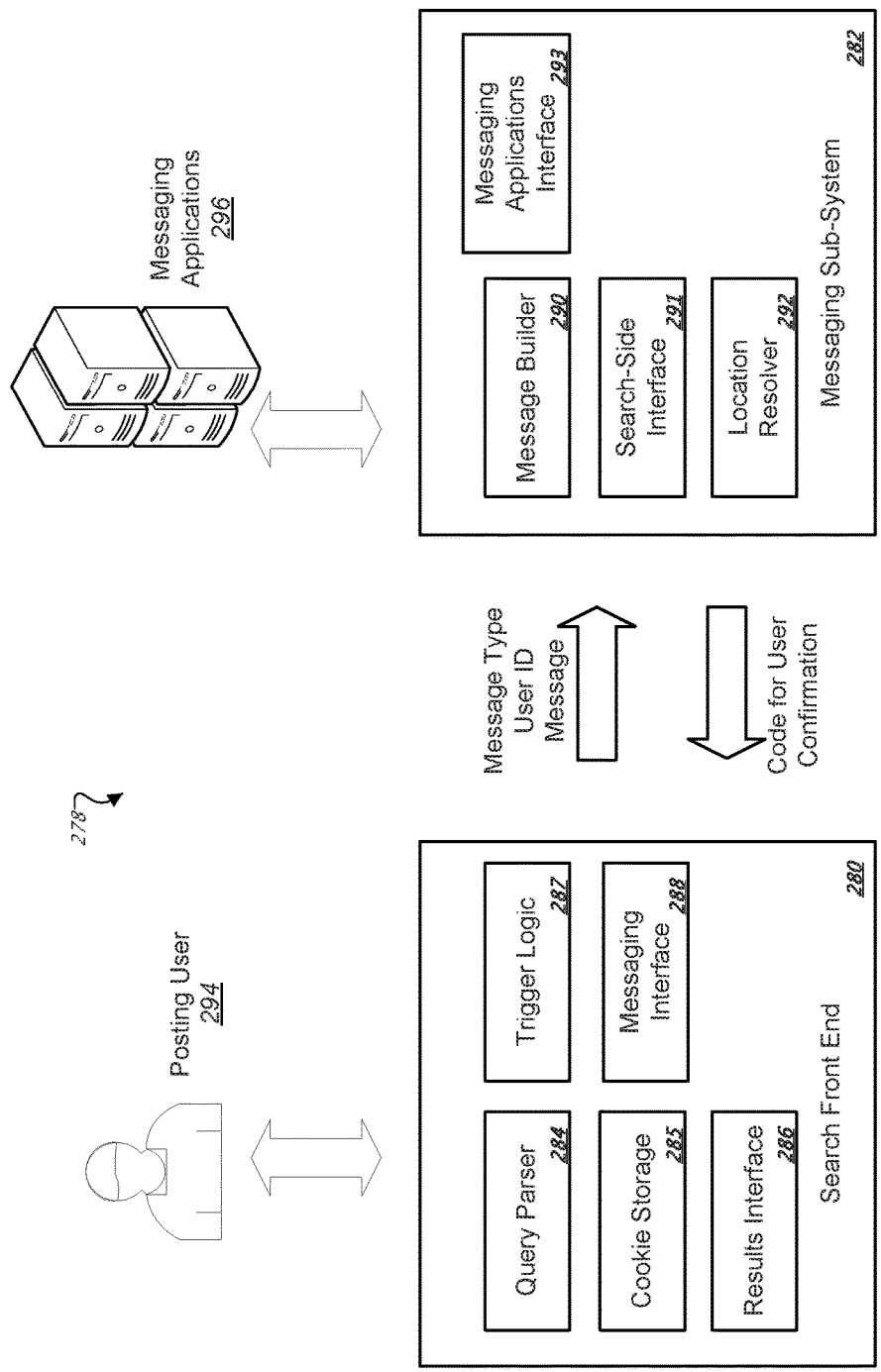
FIG. 2C is a schematic diagram showing operation of a system for receiving action commands via a search interface.

FIG. 2C is a schematic diagram showing operation of a system for receiving action commands via a search interface. The search front end 258 and messaging system 262 of FIG. 2B are generally similar to search front end 280 and messaging sub-system 282. In this example, the search front end 280 is seen in communication with a posting user 294, who is someone who is registered with the system that provides search and messaging functionality, and is interacting through a persistent search submission mechanism such as a search input field or a voice search interface. The messaging sub-system 282 in turn communicates with various messaging applications 296. Thus, for example, a message received from user 294 via search front-end 280 can be routed to messaging sub-system 282, and then, based on the type of message the user intended to send, may be provided, with appropriate meta data to the proper messaging application.

A number of example components in the search front end 280 and the messaging sub-system may be used to provide functionality like that discussed elsewhere in this document. For example, a query parser 284 may be used to break a received query into its constituent parts. As one example, a header received with the query may be stripped off, and the actual text entered by the user 294 may be isolated. That text may then be provided to trigger logic 287, which may be programmed to analyze text or speech submitted by a user to determine whether the user 294 intended non-search actions to be performed with their input. Such trigger logic may be as simple as looking for a particular leading reserved character or word, or may be more complex and involve analysis of the syntax and wording of the full user submission. When the trigger logic 287 determines that the user intended a message-based action, relevant information may be forwarded to the messaging sub-system 282. For example, as shown in the figure, the search front end 280 may send to the messaging sub-system 282 a message type (e.g., post, email, etc.), a user ID (which may be derived from a user cookie that can be stored in cookie storage 285 until it is needed), and the text of the message itself. Such information may be provided in a single string and may be parsed by the messaging sub-system, such as in a search-side interface that is responsible for communicating with the search front end 280.

The messaging sub-system may then return information, such as information needed to building a page or screen on which the user 294 may confirm to send the message. First, a message builder 290 may identify the relevant fields in a message that need to be filled out and may gather information for such fields (e.g., taking the message from the user's query, and identifying a recipient of a message that matches a parameter submitted in the query). In addition, a location resolver 292 may provide a list of possible venues that match a location for the user 294.

The messaging sub-system 282 may then provide information back to the search front end 280 so that the results interface may assemble information like that shown in FIGS. 1B and 1D above, and may provide code for generating such pages to the user's computing device. Once the user has completed confirming the intent to send a message, the messaging applications interface 293 may be provided with the relevant information needed to send the messages, may format such information for transmission to a messaging application, and may select, from the plurality of possible messaging applications, the application that should send the message.

Figure 3:
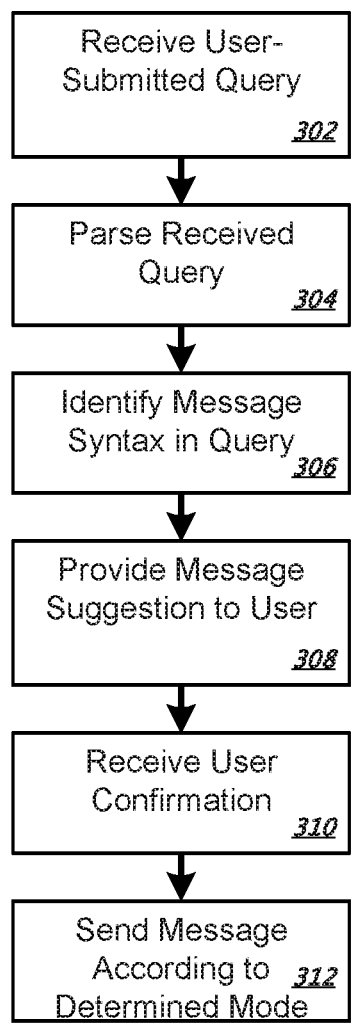
FIG. 3 is a flow chart of a process for routing a message received through a search interface.

FIG. 3 is a flow chart of a process for routing a message received through a search interface. In general, the process involves identifying, in a search query (whether typed or spoken), a user intent to initiate a non-search action, such as sending a message from a search input field. The process then involves obtaining the necessary information to carry out the non-search action, and causes the non-search action to be completed.

The process begins at box 302, where a user-submitted query is received. Such a query may be received in a familiar manner at a public search engine. The query may include query text, and may also have been provided automatically with information that identifies the user who submitted the query, and a location of the computing device on which the query was entered.

At box 304, the query is parsed. For example, header information may initially be removed from the query. Other parsing may also occur and the actual text of the query, which was submitted by the user, may be extracted. At box 306, such text is analyzed (and such text may be a speech-to-text conversion of a submitted voice query) to determine whether the text of the query is in a special syntax that indicates a user intent to have non-search actions performed. For example, the process may parse out the first two characters entered by the user, or may convert the first word or words spoken by the user, and may compare them to a white list of terms that are accepted triggers for non-search actions.

If such a syntax is not identified, the query may simply be sent to a search engine, and the search results (and accompanying ads) may be returned to the user in a traditional manner. If the syntax is identified, however, a message suggestion may be provided to the user. For example, the text that the user submitted may be organized and presented as the body of a message to be sent. The user may then decline to send the message, may select a different mode by which to send the message, and may edit the message and any relevant parameters of the message before sending it, by providing a user confirmation at box 310.

At box 312, the message is sent by way of the determined mode of communication. For example, if the user simply confirms that they want to send the message, it will be sent by the mode initially inferred by the system. If the user changes the mode (e.g., if the system initially suggests a micro-blog post, and the user changes it to "note to self"), then the message can be sent by the selected mode. Where the action is something other than communication of a message entered into the search input field, the questions asked of the user and the actions taken in response to the user's answers may vary depending on the particular implementation.

Figure 4:
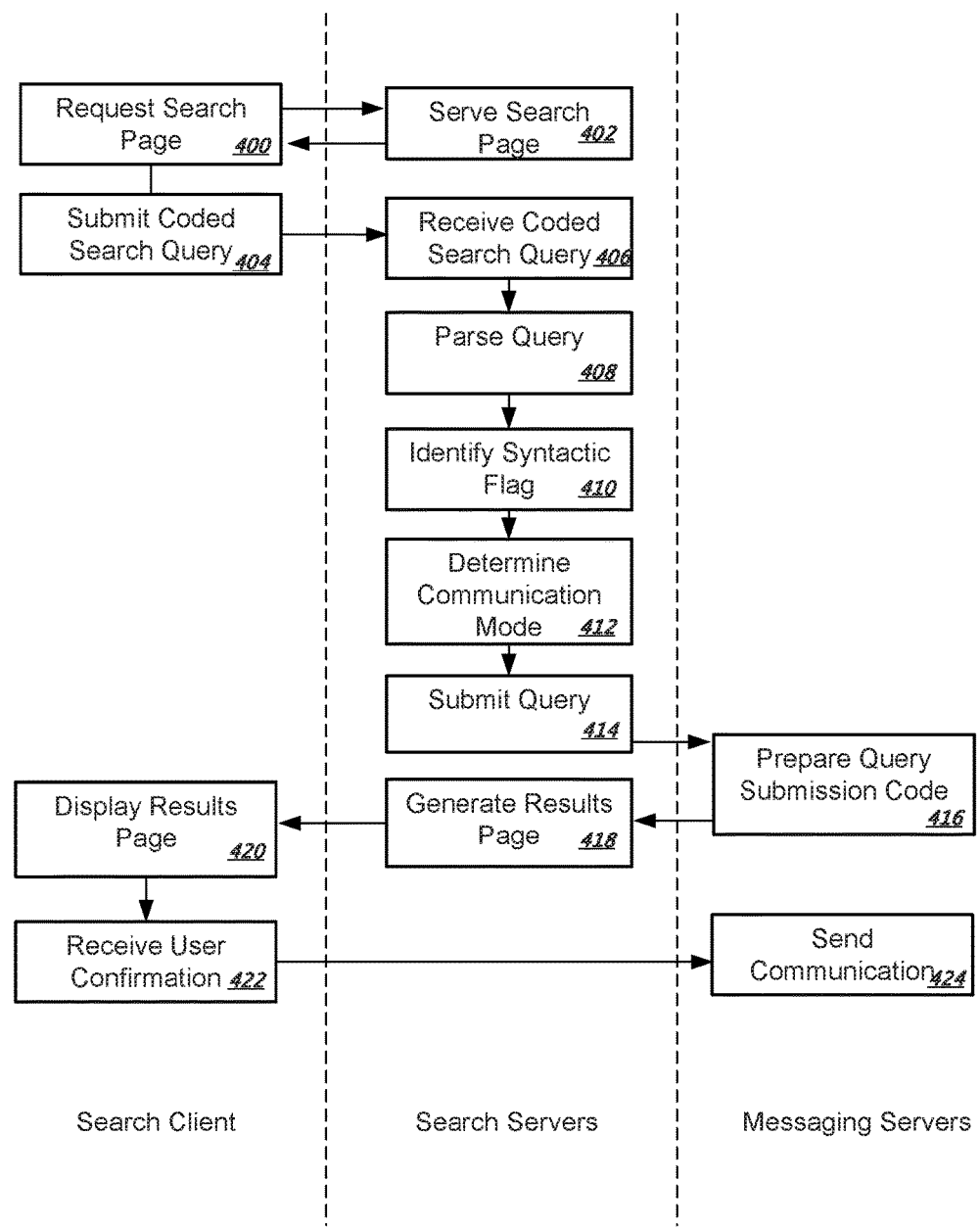
FIG. 4 is a swim lane diagram of a process for routing a message received through a search interface.

FIG. 4 is a swim lane diagram of a process for routing a message received through a search interface. The process here is similar to that discussed with respect to FIG. 3, but shows three example sub-systems that can cooperate to permit a computer user to initiate non-search actions from a search interface (e.g., a search input field on a screen or a "listening" search input field in a voice-controlled system, where search-directed user submissions need to be distinguished from non-search-related user submissions).

The process here begins at box 400, where a search client (e.g., a web browser operating on a portable computing device) requests a search page from a group of search servers (e.g., the page at www.google.com), and the servers serve the page in a conventional manner (box 402). At box 404, a user has entered text into a search input field on the search page according to a "coded" syntax, and the client submits the coded query to the search servers. The query in this example is "coded" because the user has included a "tell" to indicate that they want the server system to give them functionality instead of, or in addition to, standard search results that are directed to the text entered by the user.

The search servers then receive the query (box 406), parse it apart in a familiar manner (box 408), and identify the syntactic flag or "tell" in the query. Such a flag or tell may include, for example, a start to the query of a particular single letter followed by a space. At box 412, the search servers determine a communication mode for the user's submission. For example, the value of the flag may indicate such a mode ("z" for post, "e" for email, etc.), or other techniques may be used to make such a determination.

Alternatively, no such determination needs be made, and the user can be asked to identify the appropriate mode.

At box 414, the query is submitted by the search servers to the messaging servers. In this example, the messaging servers cooperate with the search servers to prepare a presentation by which the user is asked to confirm that he or she wants to send such a message. The messaging servers then prepare code for a page that asks the user to confirm that they want to submit the action of communicating. Such information is passed to the search servers, which in turn generate a results page (box 418) for the user, which may include the query submission code from box 416, in addition to actual search results, ads, formatting for the page or application, and other such content.

The search client then displays the results page at box 420, and the user confirms his or her intent to send the communication at box 422. The user may also edit the message during this process. Once the user has confirmed an intent to send the message, the messaging servers causes the communication to be sent according to the parameters inferred by the process and those provided explicitly and directly by the user.

Figure 5:
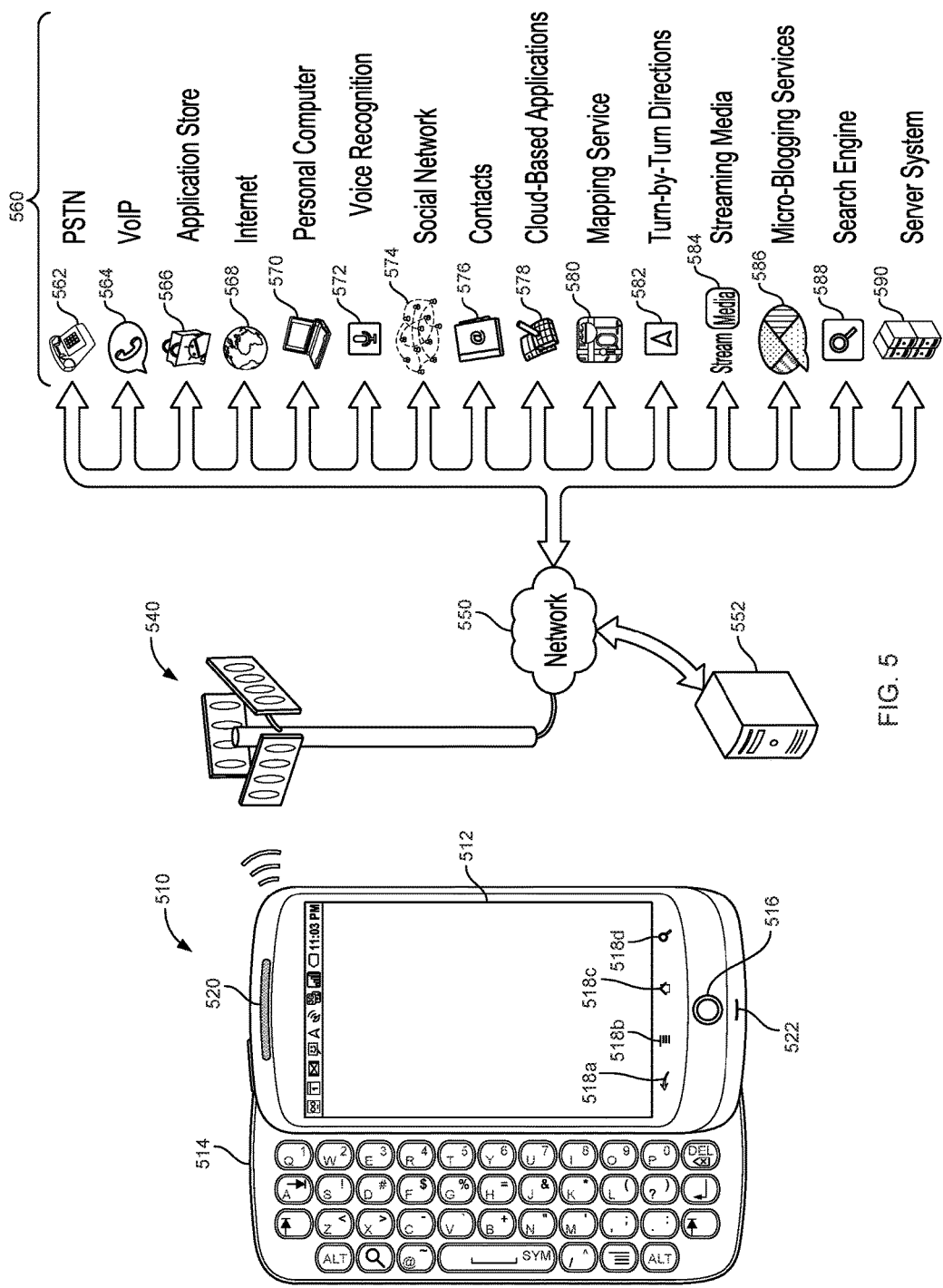
FIG. 5 is a conceptual diagram of a system that may be used to implement the systems and methods described in this document.

Referring now to FIG. 5, a conceptual diagram of a system that may be used to implement the systems and methods described in this document is illustrated. In the system, mobile computing device 510 can wirelessly communicate with base station 540, which can provide the mobile computing device wireless access to numerous hosted services 560 through a network 550.

In this illustration, the mobile computing device 510 is depicted as a handheld mobile telephone (e.g., a smartphone, or application telephone) that includes a touchscreen display device 512 for presenting content to a user of the mobile computing device 510 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 514, physical buttons, trackballs, accelerometers, gyroscopes, and magnetometers).

Example visual output mechanism in the form of display device 512 may take the form of a 3.7 or 4.3 inch LED or AMOLED display with resistive or capacitive touch capabilities, for displaying video, graphics, images, and text, and coordinating user touch inputs locationally with the displayed information so that user contact above a displayed item may be associated with the item by the device 510. The mobile computing device 510 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 514, which may be a full qwerty keyboard or a traditional keypad that includes keys for the digits '0-9', '*', and '#.' The keyboard 514 receives input when a user physically contacts or depresses a keyboard key. User manipulation of a trackball 516 or interaction with a track-pad enables the user to supply directional and rate of rotation information to the mobile computing device 510 (e.g., to manipulate a position of a cursor on the display device 512).

The mobile computing device 510 may be able to determine a position of physical contact with the touchscreen display device 512 (e.g., a position of contact by a finger or a stylus). Using the touchscreen 512, various "virtual" input mechanisms may be produced, where a user interacts with a graphical user interface element depicted on the touchscreen 512 by contacting the graphical user interface element. An example of a "virtual" input mechanism is a "software keyboard," where a keyboard is displayed on the touchscreen and a user selects keys by pressing a region of the touchscreen 512 that corresponds to each key.

The mobile computing device 510 may include mechanical or touch sensitive buttons 518a-d. Additionally, the mobile computing device may include buttons for adjusting volume output by the one or more speakers 520, and a button for turning the mobile computing device on or off. A microphone 522 allows the mobile computing device 510 to convert audible sounds into an electrical signal that may be digitally encoded and stored in computer-readable memory, or transmitted to another computing device. The mobile computing device 510 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 510 may present a graphical user interface with the touchscreen 512. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 504. User-selection of the button may invoke the pre-defined action.

In some examples, the operating system provides a "desktop" user interface that is displayed upon turning on the mobile computing device 510, activating the mobile computing device 510 from a sleep state, upon "unlocking" the mobile computing device 510, or upon receiving user-selection of the "home" button 518c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 510 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 512 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 510 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 510 may include other application modules and hardware. A call handling unit may receive an indication of an incoming telephone call and provide a user capabilities to answer the incoming telephone call. A media player may allow a user to listen to music or play movies that are stored in local memory of the mobile computing device 510. The mobile telephone 510 may include a digital camera sensor, and corresponding image and video capture and editing software. An internet browser may enable the user to view content from a web page by typing in an addresses corresponding to the web page or selecting a link to the web page.

The mobile computing device 510 may include an antenna to wirelessly communicate information with the base station 540. The base station 540 may be one of many base stations in a collection of base stations (e.g., a mobile telephone cellular network) that enables the mobile computing device 510 to maintain communication with a network 550 as the mobile computing device is geographically moved. The computing device 510 may alternatively or additionally communicate with the network 550 through a Wi-Fi router or a wired connection (e.g., Ethernet, USB, or FIREWIRE). The computing device 510 may also wirelessly communicate with other computing devices using BLUETOOTH protocols, or may employ an ad-hoc wireless network.

A service provider that operates the network of base stations may connect the mobile computing device 510 to the network 550 to enable communication between the mobile computing device 510 and other computerized devices that provide services 560. Although the services 560 may be provided over different networks (e.g., the service provider's internal network, the Public Switched Telephone Network, and the Internet), network 550 is illustrated as a single network. The service provider may operate a server system 552 that routes information packets and voice data between the mobile computing device 510 and computing devices associated with the services 560.

The network 550 may connect the mobile computing device 510 to the Public Switched Telephone Network (PSTN) 562 in order to establish voice or fax communication between the mobile computing device 510 and another computing device. For example, the service provider server system 552 may receive an indication from the PSTN 562 of an incoming call for the mobile computing device 510. Conversely, the mobile computing device 510 may send a communication to the service provider server system 552 initiating a telephone call with a telephone number that is associated with a device accessible through the PSTN 562.

The network 550 may connect the mobile computing device 510 with a Voice over Internet Protocol (VoIP) service 564 that routes voice communications over an IP network, as opposed to the PSTN. For example, a user of the mobile computing device 510 may invoke a VoIP application and initiate a call using the program. The service provider server system 552 may forward voice data from the call to a VoIP service, which may route the call over the internet to a corresponding computing device, potentially using the PSTN for a final leg of the connection.

An application store 566 may provide a user of the mobile computing device 510 the ability to browse a list of remotely stored application programs that the user may download over the network 550 and install on the mobile computing device 510. The application store 566 may serve as a repository of applications developed by third-party application developers. An application program that is installed on the mobile computing device 510 may be able to communicate over the network 550 with server systems that are designated for the application program. For example, a VoIP application program may be downloaded from the Application Store 566, enabling the user to communicate with the VoIP service 564.

The mobile computing device 510 may access content on the internet 568 through network 550. For example, a user of the mobile computing device 510 may invoke a web browser application that requests data from remote computing devices that are accessible at designated universal resource locations. In various examples, some of the services 560 are accessible over the internet.

The mobile computing device may communicate with a personal computer 570. For example, the personal computer 570 may be the home computer for a user of the mobile computing device 510. Thus, the user may be able to stream media from his personal computer 570. The user may also view the file structure of his personal computer 570, and transmit selected documents between the computerized devices.

A voice recognition service 572 may receive voice communication data recorded with the mobile computing device's microphone 522, and translate the voice communication into corresponding textual data. In some examples, the translated text is provided to a search engine as a web query, and responsive search engine search results are transmitted to the mobile computing device 510.

The mobile computing device 510 may communicate with a social network 574. The social network may include numerous members, some of which have agreed to be related as acquaintances. An acquaintanceship relationship forms between a first user and a second user of a social network in response to (i) the first user requesting to receive posts that are submitted by the second user, or (ii) the first user requesting to receive posts that are submitted by the second user and the second user confirming that the first user can be provided the posts by the social network. Application programs on the mobile computing device 510 may access the social network 574 to retrieve information based on the acquaintances of the user of the mobile computing device. For example, an "address book" application program may retrieve telephone numbers for the user's acquaintances. In various examples, content may be delivered to the mobile computing device 510 based on social network distances from the user to other members. For example, advertisement and news article content may be selected for the user based on a level of interaction with such content by members that are "close" to the user (e.g., members that are "friends" or "friends of friends").

The mobile computing device 510 may access a personal set of contacts 576 through network 550. Each contact may identify an individual and include information about that individual (e.g., a phone number, an email address, and a birthday). Because the set of contacts is hosted remotely to the mobile computing device 510, the user may access and maintain the contacts 576 across several devices as a common set of contacts.

The mobile computing device 510 may access cloud-based application programs 578. Cloud-computing provides application programs (e.g., a word processor or an email program) that are hosted remotely from the mobile computing device 510, and may be accessed by the device 510 using a web browser or a dedicated program. Example cloud-based application programs include GOOGLE DOCS word processor and spreadsheet service, GOOGLE GMAIL web-mail service, and PICASA picture manager.

Mapping service 580 can provide the mobile computing device 510 with street maps, route planning information, and satellite images. An example mapping service is GOOGLE MAPS. The mapping service 580 may also receive queries and return location-specific results. For example, the mobile computing device 510 may send an estimated location of the mobile computing device and a user-entered query for "pizza places" to the mapping service 580. The mapping service 580 may return a street map with "markers" superimposed on the map that identify geographical locations of nearby "pizza places."

Turn-by-turn service 582 may provide the mobile computing device 510 with turn-by-turn directions to a user-supplied destination. For example, the turn-by-turn service 582 may stream to device 510 a street-level view of an estimated location of the device, along with data for providing audio commands and superimposing arrows that direct a user of the device 510 to the destination.

Various forms of streaming media 584 may be requested by the mobile computing device 510. For example, computing device 510 may request a stream for a pre-recorded video file, a live television program, or a live radio program. Example services that provide streaming media include YOUTUBE and PANDORA.

A micro-blogging service 586 may receive from the mobile computing device 510 a user-input post that does not identify recipients of the post. The micro-blogging service 586 may disseminate the post to other members of the micro-blogging service 586 that agreed to subscribe to the user.

A search engine 588 may receive user-entered textual or verbal queries from the mobile computing device 510, determine a set of internet-accessible documents that are responsive to the query, and provide to the device 510 information to display a list of search results for the responsive documents. In examples where a verbal query is received, the voice recognition service 572 may translate the received audio into a textual query that is sent to the search engine.

These and other services may be implemented in a server system 590. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 6:
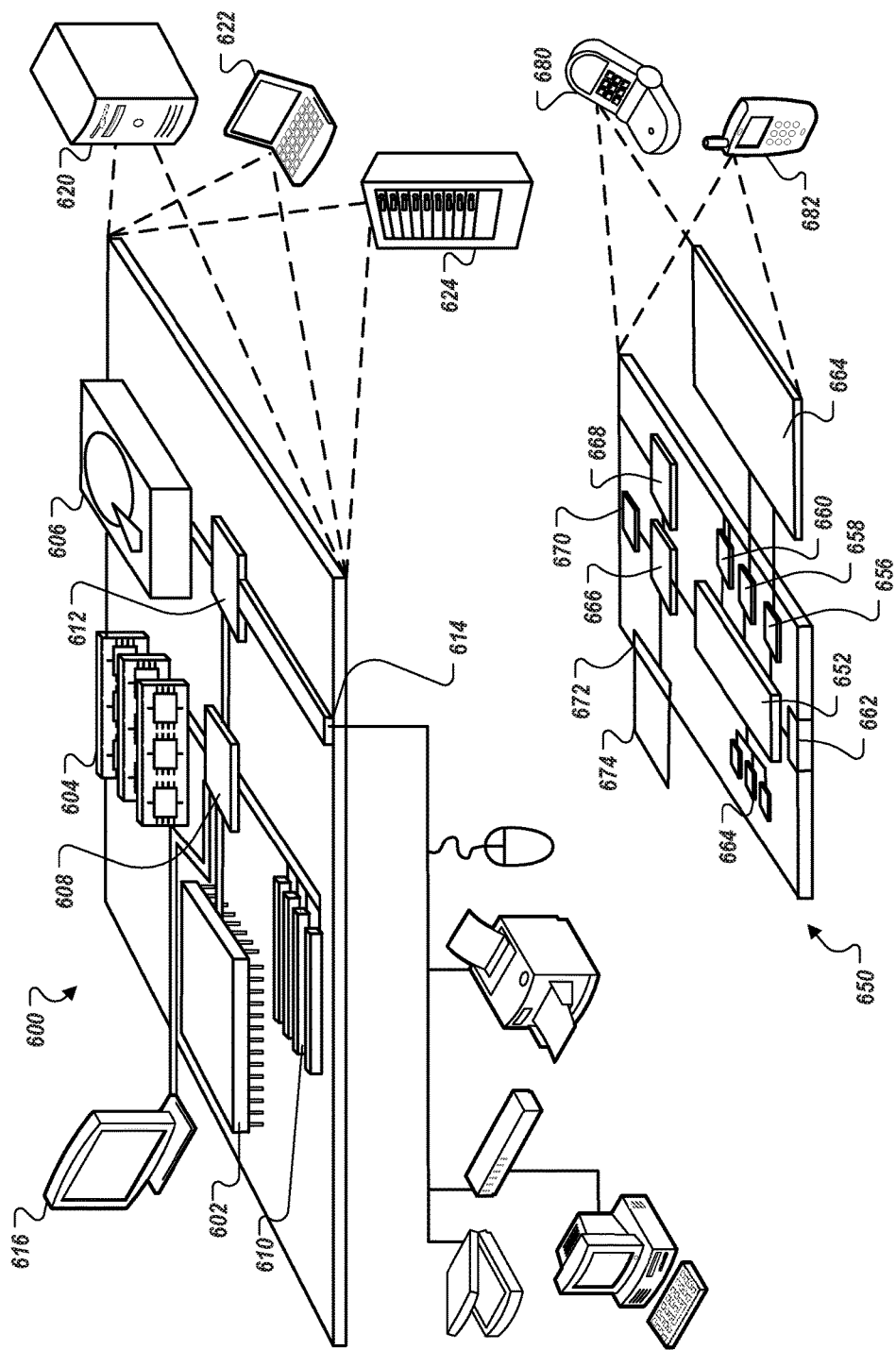
FIG. 6 is a block diagram of computing devices that may be used to implement the systems and methods described in this document.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
  receiving, at a computing device and from user interaction with service that is capable of providing search results in response to a search query, an input from a first user that comprises a reserved term;
  in response to receiving the input, identifying the reserved term as being associated communicating with one or more other users;
  generating an action that involves communicating between users to be performed by an application that is separate from the service, the generating based on the reserved term and on the input, including identifying at least one of a telephone number or a person from the input; and
  causing the computing device to initiate a communication session between the first user and the identified at least one of the telephone number or the person.

2. The method of claim 1, wherein the input comprises a voice-submitted input.

3. The method of claim 1, further comprising accessing an address book application to retrieve a telephone number for the communication session.

4. The method of claim 1, wherein the service is associated with a first application on the computing device.

5. The method of claim 1, wherein the reserved term identifies a particular action to be performed by the application.

6. The method of claim 1, wherein the communication session comprises a telephone call.

7. The method of claim 1, wherein the communication session comprises a text messaging.

8. The method of claim 1, wherein the input includes a term that indicates an intent to perform a non-search action.

9. A computer program product tangibly embodied in a non-transitory machine-readable storage device, the computer program product including instructions that, when executed, cause operations to be performed, the operations comprising:
  receiving, at a computing device and from user interaction with service that is capable of providing search results in response to a search query, an input from a first user that comprises a reserved term;
  in response to receiving the input, identifying the reserved term as being associated communicating with one or more other users;
  generating an action that involves communicating between users to be performed by an application that is separate from the service, the generating based on the reserved term and on the input, including identifying at least one of a telephone number or a person from the input; and causing the computing device to initiate a communication session between the first user and the identified at least one of the telephone number or the person.

10. The computer program product of claim 9, wherein the input comprises a voice-submitted input.

11. The computer program product of claim 9, the operations further comprising accessing an address book application to retrieve a telephone number for the communication session.

12. The computer program product of claim 9, wherein the service is associated with a first application on the computing device.

13. The computer program product of claim 9, wherein the reserved term identifies a particular action to be performed by the application.

14. The computer program product of claim 9, wherein the communication session comprises a telephone call.

15. The computer program product of claim 9, wherein the communication session comprises a text messaging.

16. The computer program product of claim 9, wherein the input includes a term that indicates an intent to perform a non-search action.

17. A system comprising:

a processor;

a storage device coupled to the processor and configurable for storing instructions, which, when executed by the processor cause the processor to perform operations comprising:

receiving, at a computing device and from user interaction with service that is capable of providing search results in response to a search query, an input from a first user that comprises a reserved term;

in response to receiving the input, identifying the reserved term as being associated communicating with one or more other users;

generating an action that involves communicating between users to be performed by an application that is separate from the service, the generating based on the reserved term and on the input, including identifying at least one of a telephone number or a person from the input; and causing the computing device to initiate a communication session between the first user and the identified at least one of the telephone number or the person.

\* \* \* \* \*